US012067754B2

(12) United States Patent
Kim et al.

(10) Patent No.: US 12,067,754 B2
(45) Date of Patent: Aug. 20, 2024

(54) ELECTRONIC DEVICE AND METHOD OF INFERRING OBJECT IN IMAGE

(71) Applicant: SAMSUNG ELECTRONICS CO., LTD., Suwon-si (KR)

(72) Inventors: Kyounghoon Kim, Suwon-si (KR); Sihoon Song, Suwon-si (KR); Sangbok Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 344 days.

(21) Appl. No.: 17/436,493

(22) PCT Filed: Jul. 16, 2021

(86) PCT No.: PCT/KR2021/009201
§ 371 (c)(1),
(2) Date: Sep. 3, 2021

(87) PCT Pub. No.: WO2022/019580
PCT Pub. Date: Jan. 27, 2022

(65) Prior Publication Data
US 2023/0177794 A1 Jun. 8, 2023

(30) Foreign Application Priority Data
Jul. 24, 2020 (KR) .................. 10-2020-0092544

(51) Int. Cl.
*G06V 10/25* (2022.01)
*G06V 10/70* (2022.01)
*G06V 10/82* (2022.01)

(52) U.S. Cl.
CPC .............. *G06V 10/25* (2022.01); *G06V 10/82* (2022.01); *G06V 10/87* (2022.01)

(58) Field of Classification Search
None
See application file for complete search history.

(56) References Cited

U.S. PATENT DOCUMENTS 10,068,171 B2   9/2018  Wshah et al.
10,304,009 B1   5/2019  Kim et al.
(Continued)

FOREIGN PATENT DOCUMENTS

KR   10-2018-0033037 A    4/2018
KR      10-1945487 B1     2/2019
KR   10-2019-0120489 A   10/2019

OTHER PUBLICATIONS

Xu et al. "Structural Design of Convolutional Neural Networks for Steganalysis", IEEE Signal Processing Letters, vol. 23, No. 5, May 2016 (Year: 2016).*

(Continued)

*Primary Examiner* — Randolph I Chu
(74) *Attorney, Agent, or Firm* — Sughrue Mion, PLLC

(57) ABSTRACT

Provided are a method and electronic device for inferring an object in an image using a convolutional neural network (CNN) model. The method includes including: identifying a first region of interest in a first frame in the moving image, and a first object in the first region of interest, by providing the first frame to convolution layer groups sequentially connected in the CNN model, identifying a second region of interest in a second frame, the second region of interest corresponding to the first region of interest, and the second frame being after the first frame, providing the second region of interest to the CNN model, and obtaining first output data output from a first convolution layer group from among the convolution layer groups, and determining whether to identify a second object in the second region of interest by using a second convolution layer group, based on the first output data.

16 Claims, 11 Drawing Sheets

(56) References Cited

U.S. PATENT DOCUMENTS

| | | | |
|---|---|---|---|
| 10,387,773 | B2 | 8/2019 | Yan et al. |
| 10,497,084 | B2 | 12/2019 | Appu et al. |
| 10,657,364 | B2 | 5/2020 | El-Khamy et al. |
| 11,555,706 | B1 * | 1/2023 | Levihn ................. G05D 1/0088 |
| 2019/0042867 | A1 | 2/2019 | Chen et al. |
| 2019/0244028 | A1 | 8/2019 | Jones et al. |
| 2019/0279040 | A1 | 9/2019 | Park |
| 2020/0302297 | A1 * | 9/2020 | Jaganathan ............ G06N 3/045 |
| 2021/0358082 | A1 * | 11/2021 | Zhu ....................... G06T 3/4046 |
| 2022/0124433 | A1 * | 4/2022 | Kupryjanow ....... G10L 21/0208 |
| 2023/0314555 | A1 * | 10/2023 | Kishigami ............. H01Q 21/08 |
| | | | 342/175 |

OTHER PUBLICATIONS

Yosinski et al., "How transferable are features in deep neural networks?" Advances in Neural Information Processing Systems, NIPS Foundation, Nov. 19, 2014 (14 total pages).

International Search Report (PCT/ISA/210) and Written Opinion (PCT/ISA/237) issued Oct. 14, 2021 by the International Searching Authority in counterpart International Patent Application No. PCT/KR2021/009201.

* cited by examiner

ELECTRONIC DEVICE AND METHOD OF INFERRING OBJECT IN IMAGE

TECHNICAL FIELD

This application is a national stage application of PCT International Application No. PCT/KR2021/009201, filed on Jul. 16, 2021, which is based on and claims priority to Korean Patent Application No. 10-2020-0092544, filed on Jul. 24, 2020, in the Korean Intellectual Property Office, the disclosure of which is incorporated by reference herein in its entirety. The disclosure relates to an electronic device and method of inferring an object in an image, and more particularly, to an electronic device and a method of inferring an object by dividing a convolution neural network.

BACKGROUND ART

An artificial intelligence (AI) system is a computer system that implements human-level intelligence, and is a system in which a machine learns, makes decisions, and derives an intended result or performs an intended operation by itself, unlike an existing rule-based smart system. The more an AI system is used, the more a recognition rate is improved and the more a user's preference is accurately understood, and thus existing rule-based smart systems are gradually being replaced by deep learning-based AI systems.

AI technology includes machine learning (deep learning) and element technologies using machine learning. Machine learning is an algorithm technology that classifies/learns features of pieces of input data by itself, and are used in various technical fields, such as linguistic understanding, visual understanding, inference/prediction, knowledge expression, and operation control.

The element technologies for implementing AI technology may include at least one of a linguistic understanding technology for recognizing human language/characters, a visual understanding technology for recognizing an object like human vision, an inference/prediction technology for logically inferring and predicting information by making a decision, a knowledge expression technology for processing human experience information as knowledge data, or an operation control technology for controlling autonomous driving of a vehicle or movement of a robot.

In a technology for analyzing an image by using an artificial neural network, an unnecessary operation may be performed as an operation is uniformly performed on a plurality of image frames. Accordingly, there is a need for a technology capable of reducing processing speed and energy consumption by performing an operation in consideration of features of objects in the plurality of image frames.

DESCRIPTION OF EMBODIMENTS

Technical Problem

Provided are an electronic device and method of inferring an object in an image, capable of reducing a processing speed and energy consumption by dividing a convolution neural network according to classes, based on an occurrence frequency and importance of the object in the image.

Technical Solution to Problem

In accordance with an aspect of the disclosure, there is provided a method of inferring an object in a moving image using a convolutional neural network (CNN) model, performed by an electronic device. The method includes: identifying a first region of interest in a first frame among a plurality of frames in the moving image, and a first object in the first region of interest, by providing the first frame to a plurality of convolution layer groups sequentially connected in the CNN model; identifying a second region of interest in a second frame among the plurality of frames, the second region of interest corresponding to the first region of interest, and the second frame being after the first frame; providing the second region of interest to the CNN model, and obtaining first output data output from a first convolution layer group from among the plurality of convolution layer groups; and determining whether to identify a second object in the second region of interest by using a second convolution layer group after the first convolution layer group from among the plurality of convolution layer groups, based on the first output data.

The method further includes selecting the first convolution layer group corresponding to the first object, from among the plurality of convolution layer groups.

The obtaining the first output data includes obtaining class probability values indicating probabilities that the second object in the second region of interest is one of first objects included in a first object group.

A plurality of object groups correspond to the plurality of convolution layer groups, respectively, and the first object group from among the plurality of object groups corresponds to the first convolution layer group.

The plurality of object groups correspond to the plurality of convolution layer groups, respectively, based on at least one of occurrence frequencies or importance of objects included in the plurality of object groups.

The plurality of object groups correspond to the plurality of convolution layer groups, respectively, based on a weight of the occurrence frequencies and a weight of the importance of the objects.

The determining whether to identify the second object in the second region of interest by using the second convolution layer group includes: calculating a difference between the class probability values; and based on the difference being equal to or greater than a threshold value, determining to identify the second object in the second region of interest by using the first output data.

The determining whether to identify the second object in the second region of interest by using the second convolution layer group includes, based on the difference being less than the threshold value, determining to identify the second object in the second region of interest by using the second convolution layer group.

The determining whether to identify the second object in the second region of interest by using the second convolution layer group includes selecting one or more kernels among a plurality of kernels in the second convolution layer group to identify the second object.

The first output data from the first convolution layer group is output using one or more kernels among a plurality of kernels in the first convolution layer group, and the obtaining the first output data includes: calculating a difference between the class probability values; and based on the difference being less than a threshold value, obtaining the first output data by using another kernel among the plurality of kernels in the first convolution layer group.

In accordance with an aspect of the disclosure, there is provided an electronic device for inferring an object in a moving image by using a convolutional neural network (CNN) model. The electronic device includes: a memory storing one or more instructions; and a processor configured to execute the one or more instructions stored in the memory to: identify a first region of interest in a first frame among a plurality of frames in the moving image, and a first object in the first region of interest, by providing the first frame to a plurality of convolution layer groups sequentially connected in the CNN model; identify a second region of interest in a second frame among the plurality of frames, the second region of interest corresponding to the first region of interest, and the second frame being after the first frame; provide the second region of interest to the CNN model, and obtain first output data output from a first convolution layer group from among the plurality of convolution layer groups; and determine whether to identify a second object in the second region of interest by using a second convolution layer group after the first convolution layer group from among the plurality of convolution layer groups, based on the first output data.

The processor is further configured to execute the one or more instructions to select the first convolution layer group corresponding to the first object, from among the plurality of convolution layer groups.

The processor is further configured to execute the one or more instructions to obtain class probability values indicating probabilities that the second object in the second region of interest is one of first objects included in a first object group.

A plurality of object groups correspond to the plurality of convolution layer groups, respectively, and the first object group from among the plurality of object groups corresponds to the first convolution layer group.

The plurality of object groups correspond to the plurality of convolution layer groups, respectively, based on at least one of occurrence frequencies or importance of objects included in the plurality of object groups.

The plurality of object groups correspond to the plurality of convolution layer groups, respectively, based on a weight of the occurrence frequencies and a weight of the importance of the objects.

The processor is further configured to execute the one or more instructions to: calculate a difference between the class probability values; and based on the difference being equal to or greater than a threshold value, determine to identify the second object in the second region of interest by using the first output data.

The processor is further configured to execute the one or more instructions to: based on the difference being less than the threshold value, determine to identify the second object in the second region of interest by using the second convolution layer group.

The processor is further configured to execute the one or more instructions to select one or more kernels among a plurality of kernels in the second convolution layer group to identify the second object.

The first output data from the first convolution layer group is output using one or more kernels among a plurality of kernels in the first convolution layer group, and the processor is further configured to execute the one or more instructions to: calculate a difference between the class probability values; and based on the difference being less than a threshold value, obtain the first output data by using another kernel among the plurality of kernels in the first convolution layer group.

In accordance with an aspect of the disclosure, there is provided a non-transitory computer-readable recording medium having recorded thereon a program for executing the method of inferring an object in a moving image using a convolutional neural network (CNN) model described above.

BRIEF DESCRIPTION OF DRAWINGS

The above and other aspects, features, and advantages of certain embodiments of the present disclosure will be more apparent from the following description taken in conjunction with the accompanying drawings, in which.

MODE OF DISCLOSURE

Figure 1:
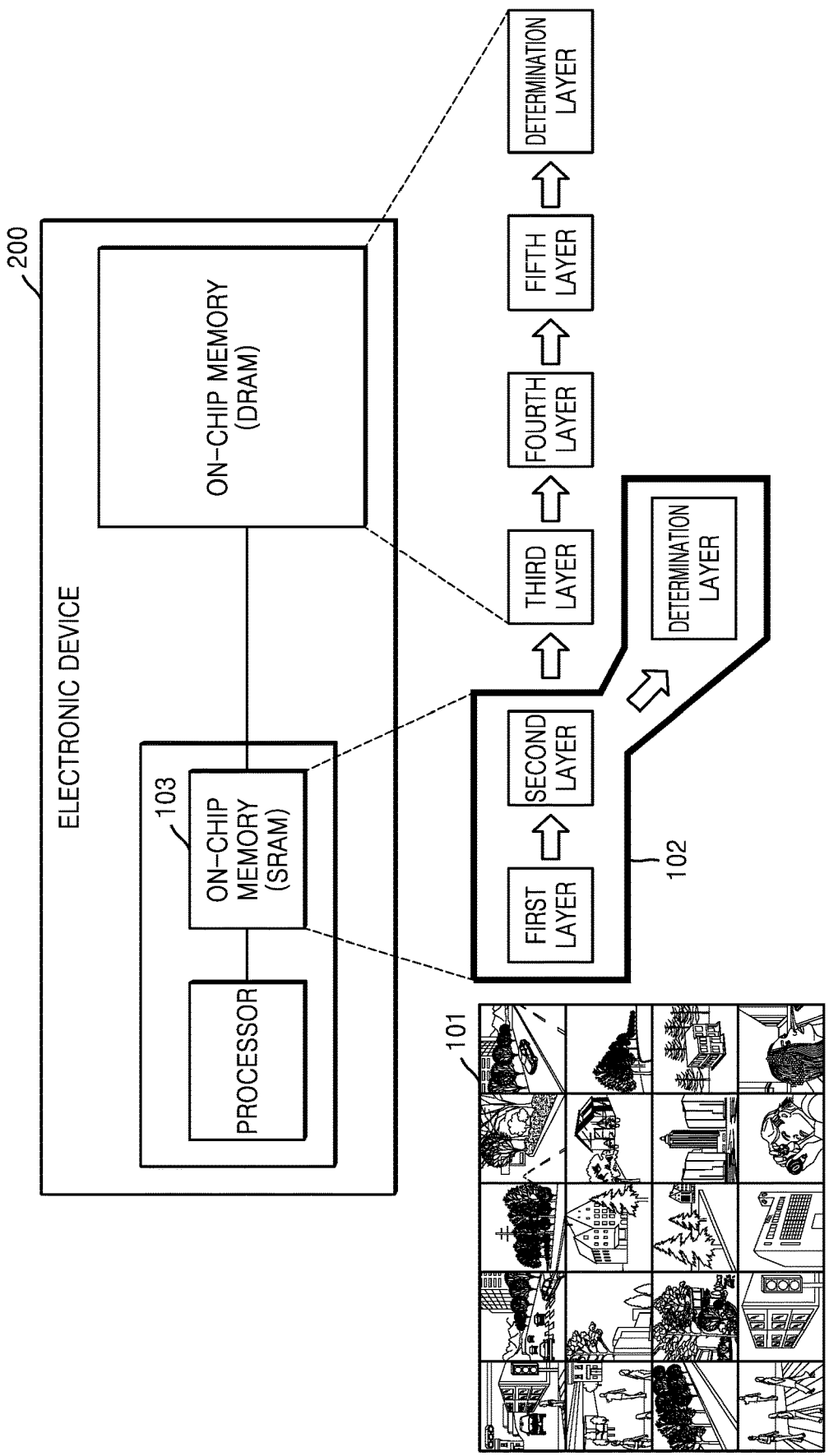
FIG. 1 is a reference diagram for describing a method, performed by an electronic device, of inferring an object by using a convolutional neural network (CNN) model, according to an embodiment of the disclosure.

Throughout the disclosure, the expression "at least one of a, b or c" indicates only a, only b, only c, both a and b, both a and c, both b and c, or all of a, b, and c.

The terms used in the specification will be briefly defined, and the disclosure will be described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

When a part "includes" or "comprises" an element, unless there is a particular description contrary thereto, the part may further include other elements, not excluding the other elements. In addition, terms such as "unit" and "module" described in the specification denote a unit that processes at least one function or operation, which may be implemented in hardware or software, or implemented in a combination of hardware and software.

Hereinafter, embodiments of the disclosure will be described in detail with reference to the accompanying drawings such that one of ordinary skill in the art may practice the embodiments of the disclosure. However, the disclosure may be implemented in various forms, and the one or more embodiments are not limited to specific embodiments described herein. In the drawings, parts irrelevant to the description are omitted to clearly describe the disclosure.

In the disclosure, a convolution layer group is a group of convolution layers included in a convolution neural network (CNN), and the convolution layers in the CNN may be divided into a plurality of convolution layer groups. The plurality of convolution layer groups may be sequentially connected. A determination layer in the convolution layer group may output a result obtained as the sequentially connected convolution layer groups perform an operation. Each convolution layer group may correspond to an object group.

In the disclosure, the object group is a group of objects inferred from the convolution layer group, and a plurality of object groups may correspond to the plurality of convolution layer groups, respectively. When an electronic device applies an image to the CNN and outputs data from the convolution layer group, the electronic device may infer objects in the image as objects included in the object group.

In the disclosure, output data output from the convolution layer group may be data output from the determination layer included in the convolution layer group. For example, a first output data denotes data output from a determination layer that performs an operation in a first convolution layer group and is included in the first convolution layer group, and second output data denotes data output from a determination layer that performs an operation in the first convolution layer group and a second convolution layer group and is included in the second convolution layer group.

FIG. 1 is a reference diagram for describing a method, performed by an electronic device 200, of inferring an object by using a CNN model, according to an embodiment.

The electronic device 200 according to an embodiment may be an electronic device used for various purposes by inferring an object present in an image, from input image data. For example, the electronic device 200 may include a mobile phone, a television (TV), or a computer capable of reproducing a moving image and searching the reproduced moving image for a product. As another example, the electronic device 200 may include an electronic device capable of capturing an image by using a camera and performing an autonomous driving function by inferring objects from the captured image. However, the electronic device 200 is not limited to the above examples, and may use a result of inferring an object of an image in various technical fields. Hereinafter, for convenience of description, an electronic device performing an autonomous driving function will be described as an example.

The electronic device 200 according to an embodiment may infer an object by reducing a data amount required for an operation, when inferring the object present in an image by executing the CNN model. In particular, to determine a class of the object, the electronic device 200 may divide the CNN into a plurality of convolution layer groups and determine the class of the object by using some of a plurality of convolution layers in the CNN.

For example, when the electronic device 200 infers the object in the image, an occurrence frequency and importance of the object to be inferred may vary. Specifically, the accuracy of determining an object may not be important for some class to which various objects belong, and the importance may vary according to the accuracy of determination each class. In this case, the importance of the object may be set depending on how accurately the electronic device 200 needs to identify the object. The electronic device 200 may group objects having similar importance, and perform object inference by varying levels of convolution layer groups used for an operation from among the plurality of convolution layer groups, with respect to objects included in different object groups.

Referring to FIG. 1, a first object group 101 having low importance corresponds to a first convolution layer group 102 located at the front of the CNN. The electronic device 200 may determine a class of an object at the front part of the CNN, for an object included in the first object group 101 having the low importance. That is, the electronic device 200 may obtain class probability values indicating probabilities that the object in the image is one of the objects included in the first object group 101, and the class probability values may be output from the first convolution layer group 102. The electronic device 200 may calculate differences between the class probability values, and when a difference is equal to or greater than a threshold value, the electronic device 200 may select a class having the highest class probability value and classify the object in the image as a class included in the first object group 101.

For example, in an electronic device performing an autonomous driving function, "street tree" among objects included in a driving image matters only when it is an obstacle to a driving vehicle, and thus is not required to be inferred at a high accuracy. Accordingly, "street tree" may be included in a first object group. The electronic device 200 may determine the class of the object in the image to a "street tree" class by using a first convolution layer, a second convolution layer, and a determination layer included in the first convolution layer group 102. In a similar manner, the electronic device 200 may determine a class of an object in the front part of the CNN, for an object having a high occurrence frequency, in consideration of the occurrence frequency of the object in the image.

When the electronic device 200 infers the object by using only the front part of the CNN, based on at least one of the importance or the occurrence frequency, inference accuracy may be lower than when the entire convolution layers of the CNN, but the operation speed of inferring an object in an image may be processed at a much faster rate.

Also, when the electronic device 200 determines the class at the front part of the CNN, a data demand amount and throughput of data used for an operation may be less than those when an operation is performed by using all pieces of data of the CNN. In this case, the electronic device 200 may perform the operation on a system memory level.

For example, when the electronic device 200 determines the class by only using the first convolution layer group 102 in the CNN model, the operation may be performed by an on-chip memory 103 (for example, static random-access memory (SRAM)). When executing the CNN model, the electronic device 200 may reduce the data demand amount and throughput by inferring the object based on the occurrence frequency and importance of the object, thereby increasing an operation speed and decreasing power consumption.

According to an embodiment, the electronic device 200 may determine the class of the object at the later part of the CNN, for an object included in an Nth object group having high necessity accuracy. The electronic device 200 may execute the CNN model and classify the object in the image to a class included in the Nth object group by using the convolution layers included in the plurality of convolution layer groups. For example, in an electronic device performing an autonomous driving function, a pedestrian among objects included in a driving image is required to be inferred at high accuracy, and thus the pedestrian may be included in an Nth object group. The electronic device 200 may determine the class of the object in the image to a "pedestrian" class by using a plurality of convolution layers and determination layers included in the first convolution layer group 102 through Nth convolution layer group. In a similar manner, the electronic device 200 may determine a class of an object having a low occurrence frequency in the later part of the CNN, in consideration of the occurrence frequency of the object in the image.

When the electronic device 200 infers the object using from the front part to the later part of the CNN based on at least one of the importance or the occurrence frequency, the operation speed may be lower but the inference accuracy may be higher compared to when the object is inferred by only using the front part of the CNN.

Figure 2:
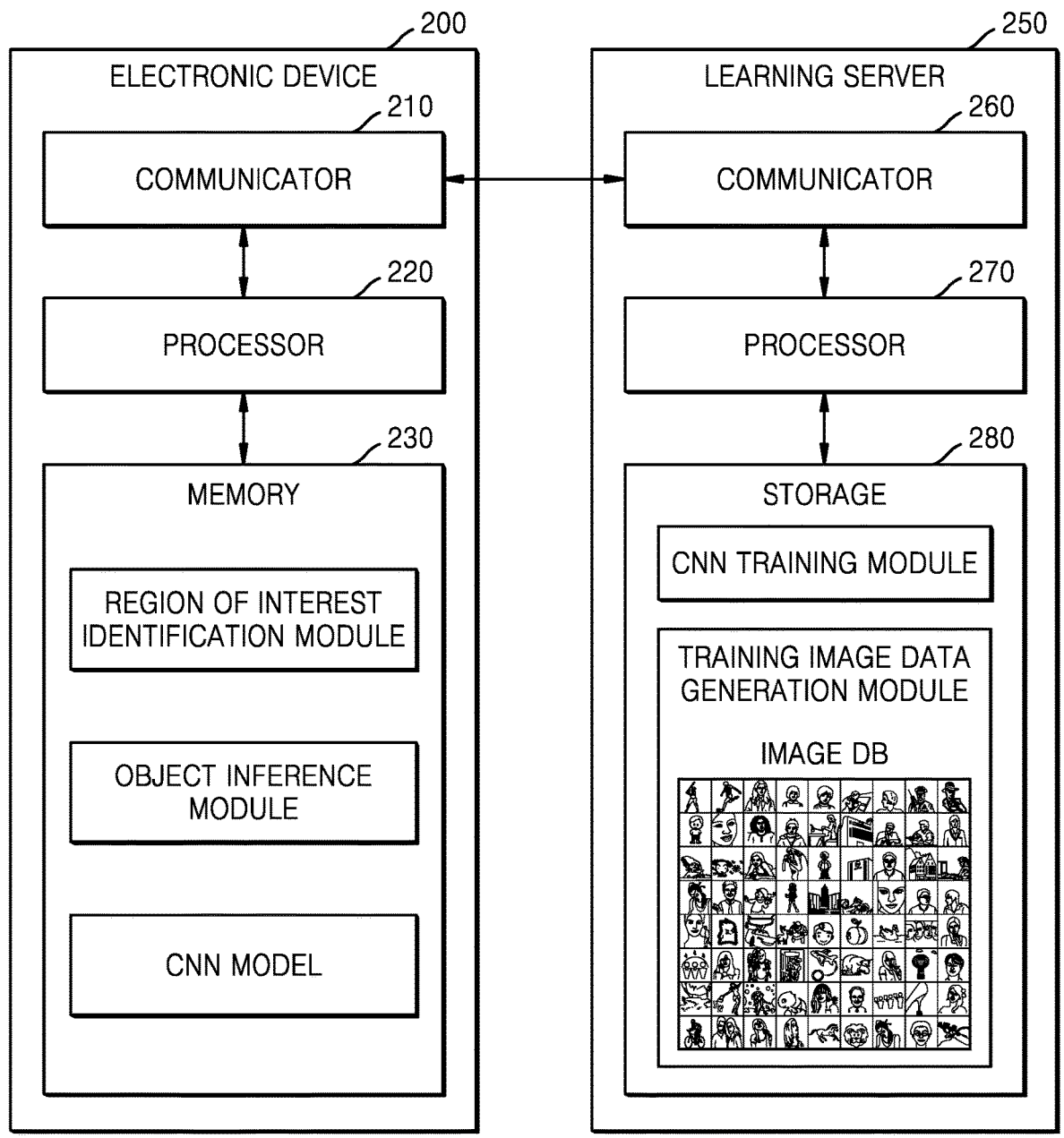
FIG. 2 is a block diagram illustrating an electronic device for inferring object and a learning server, according to an embodiment.

FIG. 2 is a block diagram illustrating the electronic device 200 for inferring object and a learning server 250, according to an embodiment.

Referring to FIG. 2, the electronic device 200 and the learning server 250 are connected to each other in a wired communication or wireless communication manner, and may perform data communication.

The electronic device 200 according to an embodiment may include a communicator 210 (or a first communicator), a processor 220 (or a first processor), and a memory 230.

The communicator 210 may be a communication interface that transmits and receives data or signals to and from an external device (for example, the learning server 250) under control by the processor 220.

The communicator 210 may include a short-range wireless communicator, a mobile communicator, or the like, in response to a performance and structure of the electronic device 200, but is not limited thereto.

The short-range wireless communicator may include a Bluetooth communicator, a Bluetooth low energy (BLE) communicator, a near field communicator, a wireless local area network (WLAN) (Wi-Fi) communicator, a Zigbee communicator, an infrared data association (IrDA) communicator, a Wi-Fi direct (WFD) communicator, an ultra wideband (UWB) communicator, an Ant+ communicator, or a microwave (uWave) communicator, but is not limited thereto.

The mobile communicator may transmit or receive a wireless signal to or from at least one of a base station, an external terminal, or a server, on a mobile communication network. Here, the wireless signal may include various types of data according to exchange of a voice call signal, an image call signal, or a text/multimedia message.

The communicator 210 according to an embodiment may transmit, to the learning server 250, object information inferred by using a CNN model. The object information transmitted to the learning server 250 may include class group information, importance information, and occurrence frequency information. The processor 220 may control the communicator 210 to transmit the object information to the learning server 250.

The processor 220 may control overall operations of the electronic device 200. The processor 220 may execute artificial intelligence (AI) models (for example, the CNN models) or one or more instructions of a program stored in the memory 230.

The processor 220 according to an embodiment may include an application processor (AP), a central processing unit (CPU), a graphics processing unit (GPU), a neural processor, or an AI-dedicated processor designed in a hardware structure specialized for processing of an AI model.

The AI model executed by the processor 220 according to an embodiment may be a CNN model, but is not limited thereto. The AI model executed by the processor 220 may be downloaded from the learning server 250 and stored in the memory 230 of the electronic device 200. The AI model stored in the memory 230 may be updated.

The processor 220 according to an embodiment may identify a first region of interest from a first frame in an image, and an object present in the first region of interest. The processor 220 may identify a second region of interest corresponding to the first region of interest and present in next frames of the image, based on the identified first region of interest and object in the region of interest. The processor 220 may obtain class probability values indicating classes of a second object present in the second region of interest, by using a first convolution layer group from among a plurality of convolution layer groups. The processor 220 may calculate a difference between class probability values by using the obtained class probability values indicating class of an object, and determine a class of the object when the difference is equal to or greater than a threshold value. Also, the processor 220 may calculate the difference between the class probability values, and when the difference is less than the threshold value, the processor 220 may be configured to determine the class of the object using a second convolution layer group that is a group after the first convolution layer group. A method by which the processor 220 infers an object in an image will be described in detail below with reference to FIGS. 8 and 9.

The memory 230 may store various pieces of data, programs, or applications to drive and control the electronic device 200. The program stored in the memory 130 may include one or more instructions. The program (one or more instructions) or application stored in the memory 230 may be executed by the processor 220.

The memory 230 according to an embodiment may include at least one type of storage medium among a flash memory type, a hard disk type, a multimedia card micro type, a card type memory (for example, a secure digital (SD) or an extreme digital (XD) memory), a random-access memory (RAM), a static RAM (SRAM), a read-only memory (ROM), an electrically erasable programmable ROM (EEPROM), a programmable ROM (PROM), a magnetic memory, a magnetic disk, and an optical disk.

The memory 230 according to an embodiment may store an AI model. The AI model may be a model received from the learning server 250. The AI model may be a CNN model, but is not limited thereto.

The learning server 250 according to an embodiment may include a communicator 260 (or a second communicator), a processor 270 (or a second processor), and a storage 280.

The communicator 260 may include one or more components enabling communication via a local area network (LAN), a wide area network (WAN), a value-added network (VAN), a mobile radio communication network, a satellite communication network, or a combination thereof.

The communicator 260 according to an embodiment may receive, from the electronic device 200, class group information and object information including an occurrence frequency and importance, transmit, to the electronic device 200, a CNN model corresponding to a class group, and update the CNN model generated by the learning server 250 by transmitting the CNN model to the electronic device 200 when necessary.

The processor 270 may be configured to control the overall operations of the learning server 250. The processor 270 according to an embodiment may execute one or more programs stored in the storage 280.

The processor 270 according to an embodiment may generate an AI model (for example, a CNN model) for inferring an object. The processor 270 may generate the AI model, based on a training data set, the class group information, and the object information including the occurrence frequency and importance, which are stored in the storage 280. The processor 270 may control the communicator 260 to transmit the generated AI model to the electronic device 200. A method by which the processor 270 generates an AI model via learning will be described in detail below with reference to FIGS. 10 and 11.

The storage 280 according to an embodiment may store various pieces of data, programs, or applications to drive and control the learning server 250. The program stored in the storage 280 may include one or more instructions. The program (one or more instructions) or application stored in the storage 280 may be executed by the processor 270.

The storage 280 according to an embodiment may include at least one type of storage medium among a flash memory type, a hard disk type, a multimedia card micro type, a card type memory (for example, a secure digital (SD) or an extreme digital (XD) memory), a random-access memory (RAM), a static RAM (SRAM), a read-only memory (ROM), an electrically erasable programmable ROM (EEPROM), a programmable ROM (PROM), a magnetic memory, a magnetic disk, and an optical disk.

The storage 280 according to an embodiment may store an AI model that is trained.

The components of the block diagrams shown in FIGS. 1 and 2 may be integrated, a component may be added, or a component may be omitted according to the specification of each device that is actually implemented. In other words, two or more components may be integrated into one component or one component may be divided into two or more components when necessary. Also, a function performed by each block is only for describing embodiments of the disclosure and specific operations or apparatuses do not limit the scope of right of the disclosure.

Figure 3:
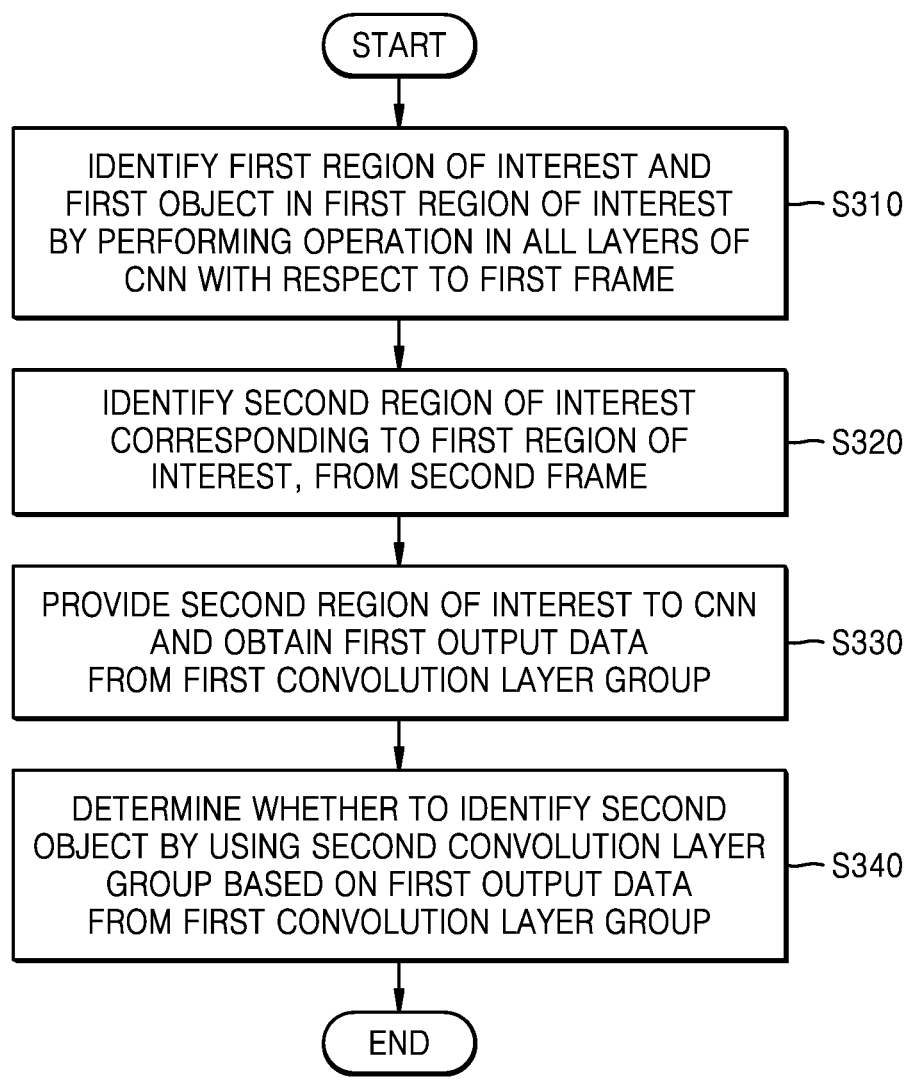
FIG. 3 is a flowchart of a method, performed by an electronic device, of inferring an object by using a convolution neural network (CNN) model, according to an embodiment.

FIG. 3 is a flowchart of a method, performed by the electronic device 200, of inferring an object by using a CNN model, according to an embodiment.

In operation S310, the electronic device 200 may identify a first region of interest in a first frame and a first object in the first region of interest. The electronic device 200 may perform an operation in all convolution layers included in the CNN model by providing or inputting the first frame to the CNN model, and identify the first region of interest and the first object in the first frame.

Information obtained by the electronic device 200 according to an embodiment by identifying the first object may include class information of the first object, i.e., inference information determined in a determination layer of a CNN, and information about a kernel to be used in the CNN to infer a second object, and the electronic device 200 may obtain information about whether the first object is present, but the disclosure is not limited thereto.

When the electronic device 200 identifies the first region of interest and first object by using the entire CNN with respect to the first frame, more accurate data may be obtained compared to when some of the CNN is used.

The electronic device 200 according to an embodiment may determine a level of a convolution layer group for identifying the second object from a second frame, based on first object information. In this case, the level of the convolution layer group may correspond to an order of convolution layer groups that are sequentially connected. For example, a level of a first convolution layer group located at the front of the CNN may be a first level, and a level of a second convolution layer group located after the first convolution layer group may be a second level.

Detailed description for identifying the first region of interest will be described with reference to FIG. 4. Also, the first region of interest identified in operation S310 is described by using a singular expression, but is not limited thereto, and a plurality of first regions of interest and first objects present in the first region of interest may be identified in the first frame.

In operation S320, the electronic device 200 may identify a second region of interest corresponding to the first region of interest, from a second frame after the first frame.

For example, the electronic device 200 may identify the second region of interest in the second frame subsequent to the first frame, and the second region of interest in the second frame may be the same as the first region of interest identified in the first frame. As an example, the electronic device 200 may identify the second region of interest in the second frame after the first frame, as a region in a similar range to the first region of interest, considering a certain error. Specifically, an area of the second region of interest in the second frame may be the same or substantially similar to an area of the first region of interest in the first frame. As another example, the electronic device 200 may identify the second region of interest based on the first object information (for example, the class of the first object or presence of the first object).

Detailed description about an embodiment in which the electronic device 200 identifies the second region of interest corresponding to the first region of interest will be described with reference to FIG. 4. There may be a plurality of second regions of interest determined in the second frame, there may be a plurality of objects present in the second region of interest, and there may be a plurality of second frames after the first frame.

In operation S330, the electronic device 200 may apply the second region of interest to the CNN and obtain first output data output from the first convolution layer group included in a plurality of convolution layer groups.

Here, a first object group may correspond to the first convolution layer group, and the first output data may be data about a second object in the second region of interest.

The electronic device 200 according to an embodiment may obtain, as the first output data, class probability values indicating probabilities that the second object is one of the objects included in the first object group. For example, when the objects included in the first object group are "street tree", "dove", and "cloud", the electronic device 200 may obtain, as the first output data, the class probability values that the second object corresponds to "street tree", "dove", and "cloud" classes.

An object group according to an embodiment may correspond to a convolution layer group, based on at least one of importance or occurrence frequencies of the objects. For example, the first object group may include objects having low importance or high occurrence frequencies, based on importance and an occurrence frequency.

The object group according to an embodiment may correspond to a convolution layer group determined based on a weight of the importance and a weight of the occurrence frequencies of the objects. For example, when the electronic device 200 performs an autonomous driving function, the object group may correspond to a convolution layer group that weighs more on the importance of the object than the occurrence frequency of the object in an image. As another example, when the electronic device 200 performs a function of searching an image for a product, the object group may correspond to a convolution layer group that weighs more on the occurrence frequency of the object than the importance of the object in the image.

In operation S340, the electronic device 200 may determine whether to identify a second object in the second region of interest by using a second convolution layer group after the first convolution layer group from among the plurality of convolution layer groups, based on the first output data. In this case, the first output data may be the class probability values indicating the probabilities that the second object is one of the objects included in the first object group.

When a difference between the obtained class probability values is equal to or greater than a threshold value, the electronic device 200 according to an embodiment may not use the second convolution layer group and may determine a class having the highest class probability value as a class of the second object.

When the difference between the obtained class probability values is less than the threshold value, the electronic device 200 according to an embodiment may use the second convolution layer group to identify the class of the second object.

When the difference between the obtained class probability values is less than the threshold value, the electronic device 200 according to an embodiment of the disclosure may increase the number of kernels used in the first convolution layer group to identify the class of the second object.

A method by which the electronic device 200 determines whether to use the second convolution layer group, based on the first output data, will be described in detail with reference to FIG. 8.

The electronic device 200 according to an embodiment may repeat operations S310 through S340 at regular frame periods. The electronic device 200 may repeat operations S310 through S340, based on randomly selected time points for a predetermined time period. Also, the electronic device 200 may repeat operations S310 through S340, based on a time point when a specific event (for example, a pixel change equal to or greater than a threshold value) occurs in the first frame or at least one second frame.

Figure 4:
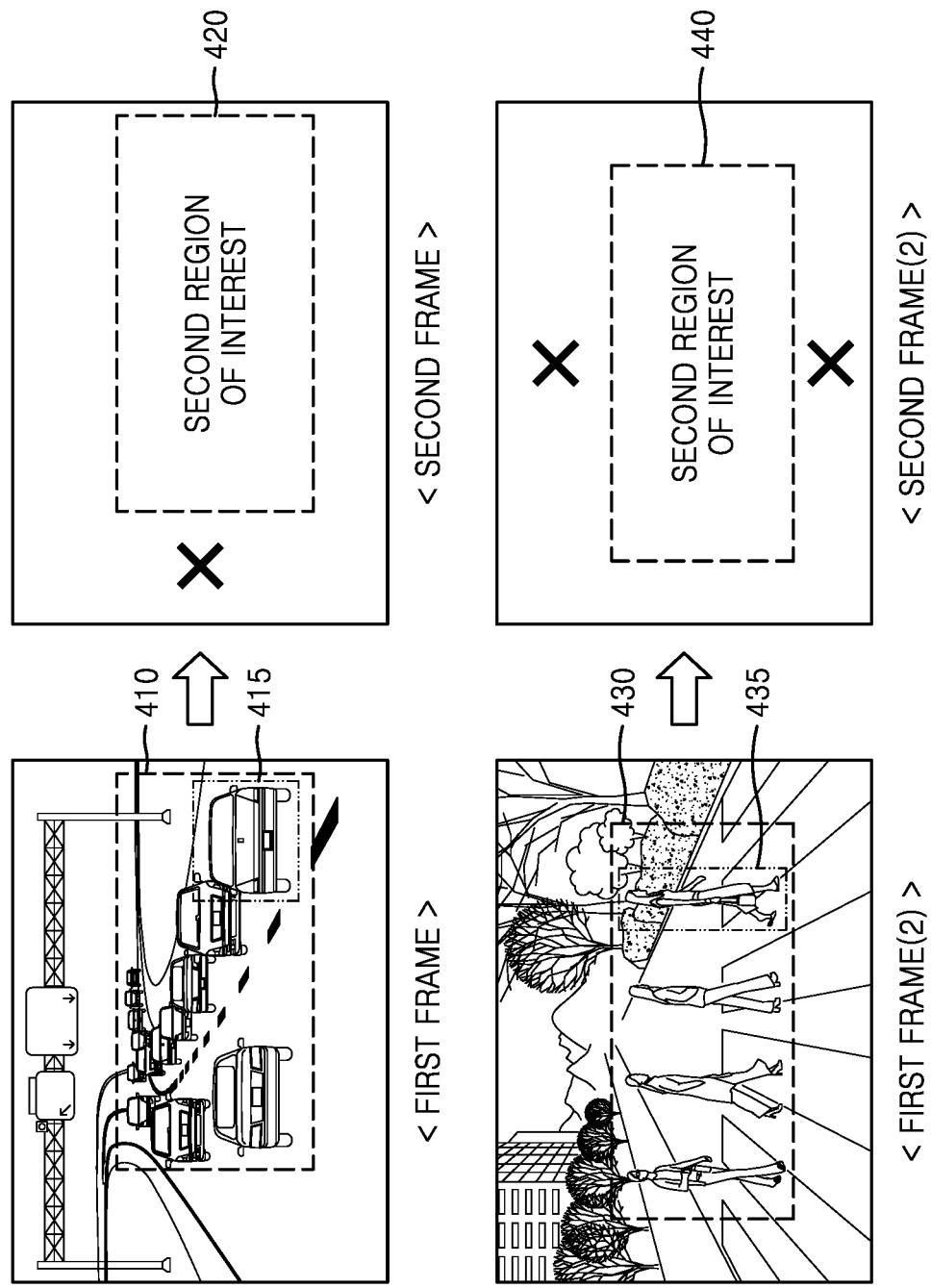
FIG. 4 is a reference diagram for describing a method, performed by an electronic device, of identifying a first region of interest from a first frame and a second region of interest from a second frame when inferring an object, according to an embodiment of the disclosure.

FIG. 4 is a reference diagram for describing a method, performed by the electronic device 200, of identifying a first region of interest from a first frame and a second region of interest from a second frame, according to an embodiment.

Referring to FIG. 4, the electronic device 200 according to an embodiment may be an electronic device capable of performing an autonomous driving function. The electronic device 200 may identify, from a first frame, a first region of interest 410 in which at least one object is present, by inputting the first frame included in an image captured during driving to a CNN. The electronic device 200 may identify objects present in the first region of interest 410. For example, a vehicle 415 among other the objects in the first region of interest 410 may be identified as a first object. When identifying the first region of interest 410 and the objects present in the first region of interest 410, the electronic device 200 may identify a region of interest and an object in the first frame by using all or at least some of convolution layers of the CNN.

When the electronic device 200 infers the object in the first region of interest 410, the electronic device 200 performs an operation by using more convolution layers than when inferring an object in a second region of interest 420, and thus object inference accuracy may be higher. In this case, the electronic device 200 may correct or verify an object inference result obtained for the second region of interest 420, by using first object information identified in the first region of interest 410.

The electronic device 200 according to an embodiment may identify, from a second frame after the first frame, the second region of interest 420 corresponding to the first region of interest 410 identified from the first frame, and perform object inference mainly based on the second region of interest 420 for the second frame. There may be a plurality of second frames that are frames after the first frame.

The electronic device 200 according to an embodiment may identify, from the second frame that is a frame after the first frame, a region identical to the first region of interest 410 identified from the first frame, as the second region of interest 420.

The electronic device 200 according to an embodiment may identify, from the second frame that is a frame after the first frame, a region within a similar range to the first region of interest 410 identified from the first frame, as the second region of interest 420, considering a certain error.

The electronic device 200 according to an embodiment may identify the second region of interest 420 based on the first object information (for example, the class of a first object or presence of a first object). For example, when a class of a first object is "vehicle", the electronic device 200 may widely identify a second region of interest because "vehicle", i.e., the first object, is highly likely to be moved in a second frame. As another example, when a class of a first object is "dove", "dove", i.e., the first object, has low importance during autonomous driving and thus may not be identified from a second region of interest. However, embodiments of identifying a second region of interest based on first object information are not limited to the above examples.

When the electronic device 200 according to an embodiment inputs the second frame to a CNN, there may be less data input to the CNN because an operation is performed in convolution layers only for the second region of interest 420.

An operation of inferring a first region of interest and an object for a first frame and an operation of inferring an object in a second region of interest of a second frame may be repeatedly performed based on a certain condition for the electronic device 200 according to an embodiment to perform object inference. The certain condition for repeating the operations may include, for example, a certain cycle, a specific event occurrence, or a random time point, but is not limited thereto. In detail, to repeat the operations in an image, the electronic device 200 may determine a new frame as a first frame (2) that is a frame different from the first frame described above, identify a first region of interest 430 and an object (a pedestrian 435) in the first region of interest 430 for the first frame (2) in the same manner as above, and determine a second region of interest 440 in the same manner as above for a second frame (2) different from the second frame described above.

Figure 5:
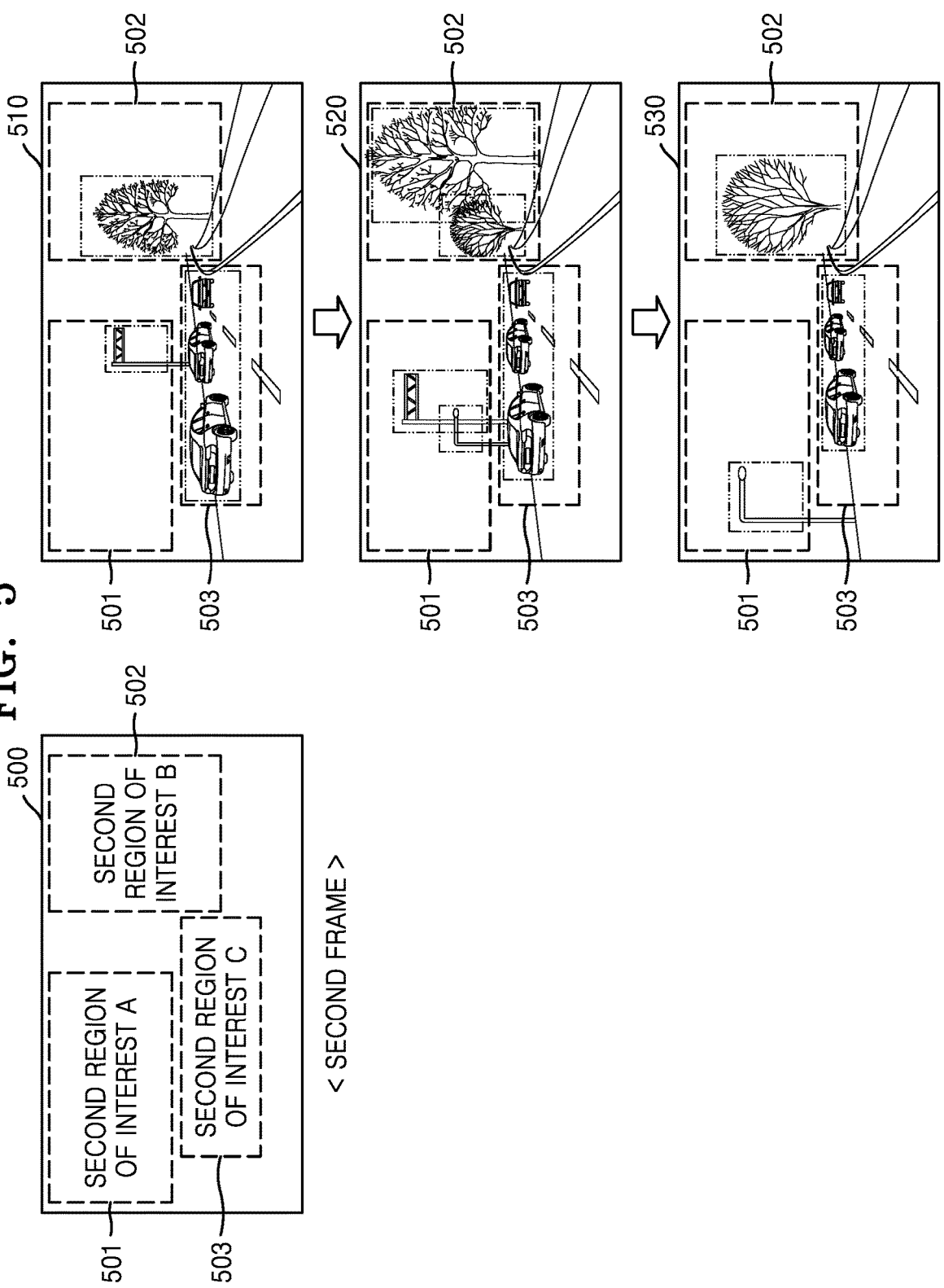
FIG. 5 is a reference diagram for describing a method, performed by an electronic device, of inferring an object mainly based on a second region of interest in a second frame, according to an embodiment.

FIG. 5 is a reference diagram for describing a method, performed by the electronic device 200, of inferring an object mainly based on a second region of interest in a second frame, according to an embodiment.

Referring to FIG. 5, the electronic device 200 may identify at least one second region of interest from a region of interest identified from a first frame.

For example, as shown in a second frame 500 of FIG. 5, the electronic device 200 may identify a plurality of second regions of interest corresponding to a plurality of first regions of interest identified from the first frame, e.g., a second region of interest A 501, a second region of interest B 502, and a second region of interest C 503. In this case, a convolution layer group used by the electronic device 200 to infer an object from each second region of interest may vary depending on a second object present in the second region of interest. For example, the electronic device 200 may use a first convolution layer group to infer the second object. As another example, the electronic device 200 may use the first convolution layer group and a second convolution layer group to infer the second object. As another example, the electronic device 200 may use the first convolution layer group through an Nth convolution layer group to infer the second object.

A method by which the electronic device 200 uses at least one convolution layer group to infer an object from a second region of interest will be described in detail with reference to FIGS. 8 and 9.

The electronic device 200 according to an embodiment may infer an object from at least one second region of interest in at least one second frame.

For example, the electronic device 200 may perform object inference for each of the second region of interest A 501, the second region of interest B 502, and the second region of interest C 503 as shown in the second frame 500 of FIG. 5, in a first second frame 510 among the plurality of second frames. In particular, the electronic device 200 may infer, from the first second frame 510, an object present in the second region of interest A 501 as a class of "streetlight", an object present in the second region of interest B 502 as a class of "street tree", and an object present in the second region of interest C 503 as a class of "vehicle". In the same manner, the electronic device 200 may infer objects present in seconds region of interest for each second region of interest in a second second frame 520 and a third second frame 530 among the plurality of second frames.

When the electronic device 200 infers an object from a second region of interest, a convolution layer group obtaining a class probability values for each second region of interest may vary depending on a second object present in the second region of interest.

Figure 6:
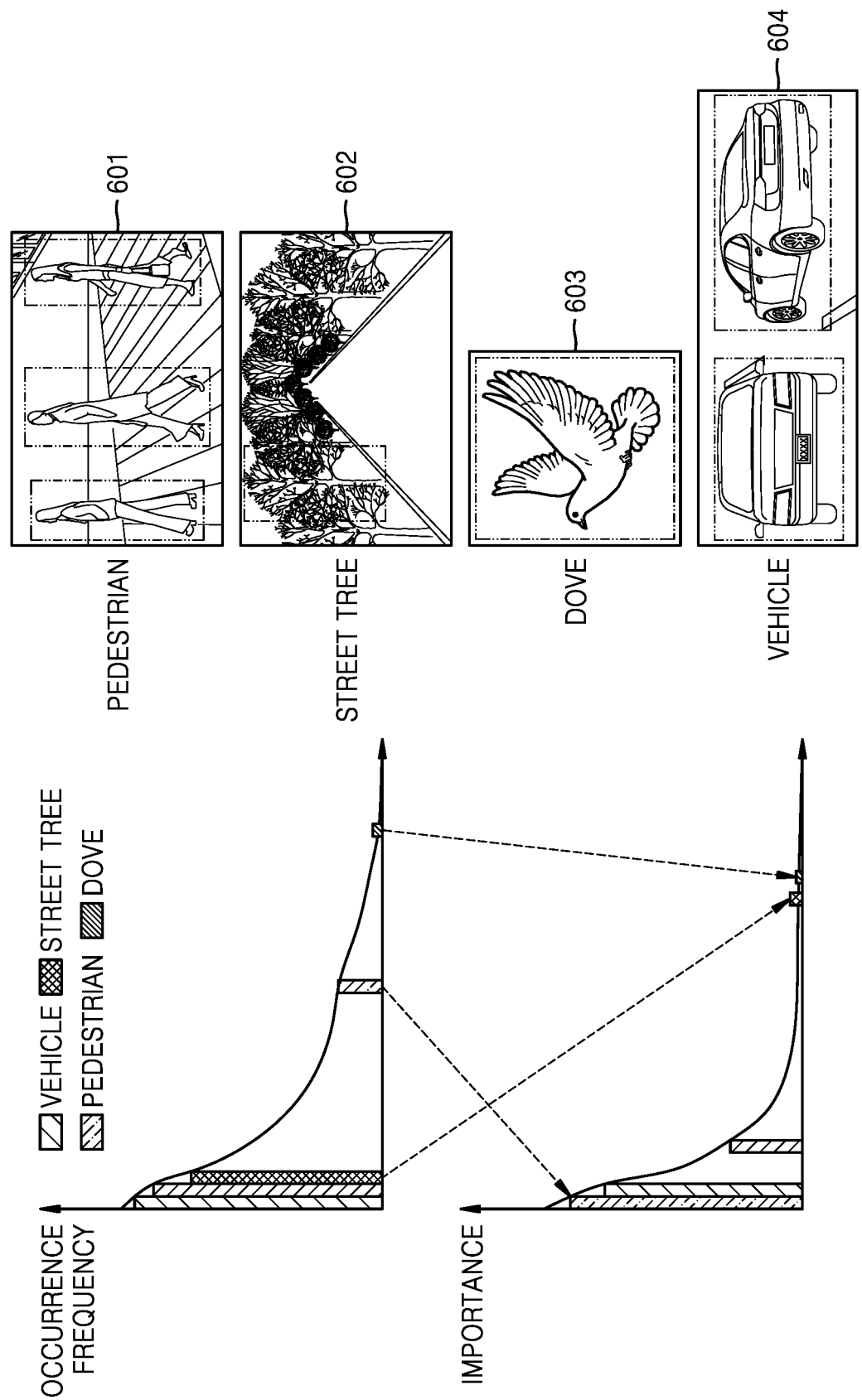
FIG. 6 is a reference diagram for describing a plurality of object groups corresponding to a plurality of convolution layer groups, according to occurrence frequencies and importance, according to an embodiment.
Figure 7:
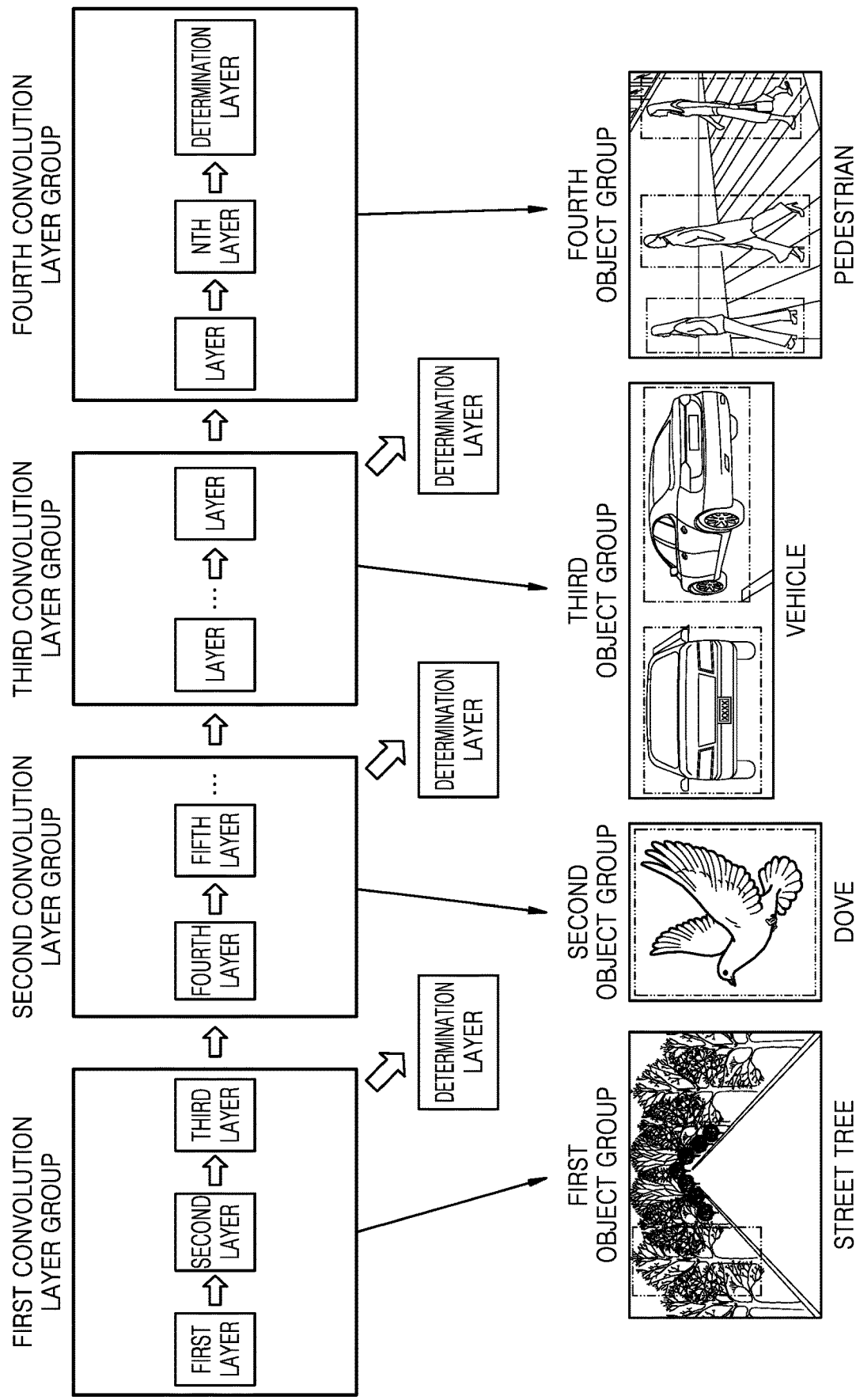
FIG. 7 is a reference diagram for describing a plurality of object groups corresponding to a plurality of convolution layer groups, respectively, according to an embodiment.

FIGS. 6 and 7 are reference diagrams for describing that a plurality of object groups correspond to a plurality of convolution layer groups according to embodiments.

FIG. 6 is a reference diagram for describing a plurality of object groups corresponding to a plurality of convolution layer groups, according to occurrence frequencies and importance, according to an embodiment.

Referring to FIG. 6, the electronic device 200 according to an embodiment may be an electronic device capable of performing an autonomous driving function.

When the electronic device 200 according to an embodiment performs the autonomous driving function, occurrence frequencies and importance of objects in an image captured during driving may be as shown in graphs of FIG. 6. In this case, a plurality of object groups may be determined by grouping objects having similar occurrence frequencies and importance, based on the occurrence frequencies and importance of the objects in the image, and each object group may correspond to a convolution layer group.

For example, a "street tree" object 602 may be included in a first object group because an occurrence frequency is high but importance is low. As another example, a "dove" object 603 may be included in a second object group because an occurrence frequency and importance are low. As another example, a "vehicle" object 604 may be included in a third object group because an occurrence frequency and importance are high. As another example, a "pedestrian" object 601 may be included in a fourth object group because an occurrence frequency is low but importance is high.

In the above embodiment, an object group determined based on an occurrence frequency and importance has been described as an example, but the object group is not limited thereto and may be determined based on at least one of the occurrence frequency of an object or the importance of an object.

Also, in the above embodiment, it has been described that the object group is pre-determined based on at least one of the occurrence frequency or the importance, but the object group is not limited thereto, and the electronic device 200 may determine the object group and update the object group according to various embodiments.

FIG. 7 is a reference diagram for describing a plurality of object groups corresponding to a plurality of convolution layer groups, respectively, according to an embodiment.

Referring to FIG. 7, a CNN model may include four convolution layer groups. In this case, a plurality of convolution layer groups may be sequentially connected to configure the entire CNN mode, and each convolution layer group may include a determination layer.

A plurality of object groups may correspond to the plurality of convolution layer groups, respectively. For example, a first object group including "street tree" may correspond to a first convolution layer group. Also, a second object group including "dove" may correspond to a second convolution layer group. Also, a third object group including "vehicle" may correspond to a third convolution layer group. Also, a fourth object group including "pedestrian" may correspond to a fourth convolution layer group.

To infer a second object present in a second region of interest, the electronic device 200 may apply the second region of interest to the CNN model and obtain output data.

For example, the electronic device 200 may first obtain first output data output from the first convolution layer group. In this case, the first output data may be class probability values indicating probabilities that the second object is one of objects included in the first object group.

The electronic device 200 may calculate a difference between the class probability values obtained from the first convolution layer group. When the difference is equal to or greater than a threshold value, the electronic device 200 may determine a class of the second object to be a class of "street tree" included in the first object group. When the difference is less than the threshold value, the electronic device 200 may further perform an operation in the second convolution layer group to identify the class of the second object.

Then, the electronic device 200 may obtain second output data output from the second convolution layer group. In this case, the second output data may be class probability values indicating probabilities that the second object is one of objects included in the second object group.

The electronic device 200 may calculate a difference between the class probability values obtained from the second convolution layer group. When the difference is equal to or greater than the threshold value, the electronic device 200 may determine the class of the second object to be a class of "dove" included in the second object group. When the difference is less than the threshold value, the electronic device 200 may further perform an operation in the third convolution layer group to identify the class of the second object.

In the same manner, the electronic device 200 may determine the class of the second object by using output data output from the third convolution layer group and the fourth convolution layer group. As such, the electronic device 200 may infer an object at an early stage by performing lesser operations than when an object is inferred by using the entire CNN, based on an occurrence frequency and importance.

The electronic device 200 may determine a level of a convolution layer group for identifying the second object, based on first object information. For example, when the first object information is "street tree", the level of the convolution layer group is determined to be the first convolution layer group that is a first level, when the first object information is "dove", the level of the convolution layer group is determined to be the second convolution layer group that is a second level, when the first object information is "vehicle", the level of the convolution layer group is determined to be the third convolution layer group that is a third level, and when the first object information is "pedestrian", the level of the convolution layer group is determined to be the fourth convolution layer group that is a fourth level, and the second object may be inferred by performing an operation up to a convolution layer group of the determined level.

In FIG. 7, it has been described that there are four convolution layer groups for convenience of description, but the number of convolution layer group is not limited thereto and may vary according to various embodiments.

Figure 8:
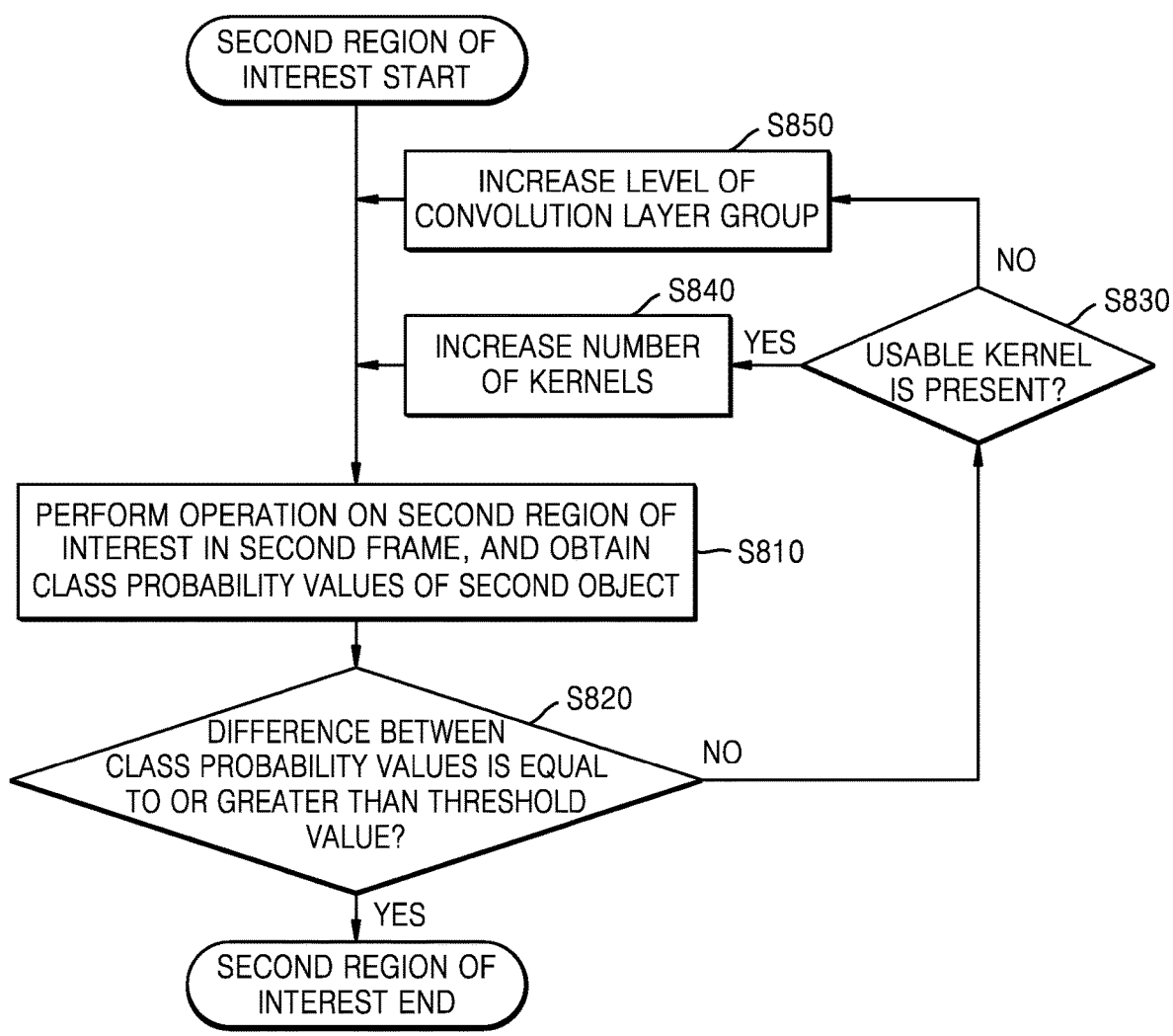
FIG. 8 is a flowchart of a method, performed by an electronic device, of inferring a second object in a second region of interest, according to an embodiment.
Figure 9:
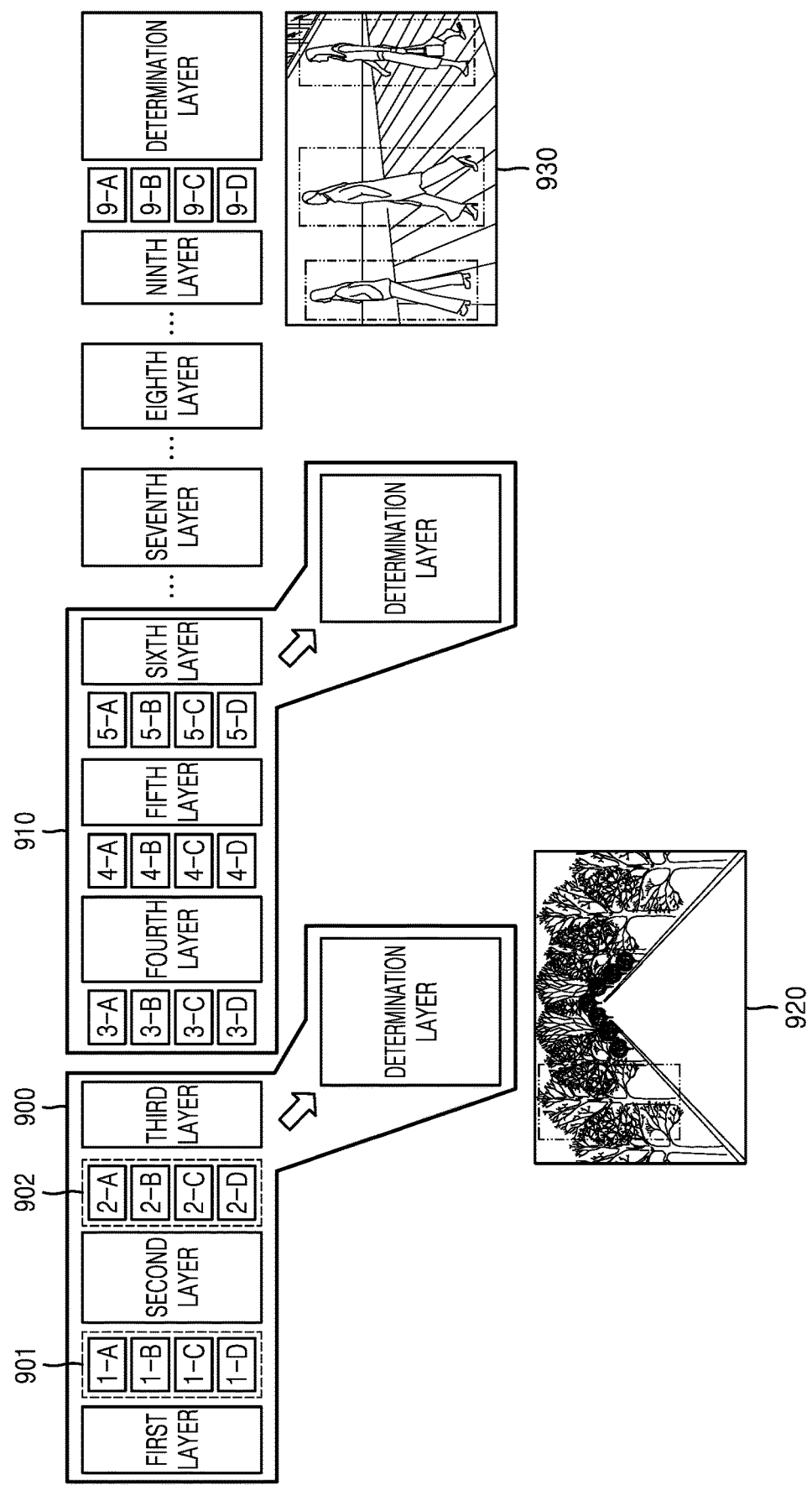
FIG. 9 is a reference diagram for describing a method, performed by an electronic device, of using at least one convolution layer group to infer a second object in a second region of interest, according to an embodiment.

FIGS. 8 and 9 are reference diagrams for describing a method, performed by the electronic device 200, of using at least one convolution layer group for object inference in a second region of interest, according to an embodiment.

FIG. 8 is a flowchart of a method, performed by the electronic device 200, of inferring a second object in a second region of interest, according to an embodiment.

The electronic device 200 according to an embodiment may identify, from a first frame, a first region of interest and a first object in the first region of interest, and identify, from a second frame, a second region of interest corresponding to the first region of interest. This corresponds to operations S310 and S320 of FIG. 3, and thus descriptions thereof are not provided again.

The electronic device 200 according to an embodiment may apply the identified second region of interest to a CNN model and obtain output data. The output data may be class probability values indicating probabilities that a second object is one of objects included in an object group.

The electronic device 200 according to an embodiment may apply the second region of interest in the second frame to the CNN model. The CNN model may include a plurality of convolution layer groups that are sequentially connected, as described above with reference to FIG. 7.

In operation S810, the electronic device 200 may perform an image processing operation on the second region of interest and infer a second object in the second region of interest. Specifically, the electronic device 200 may perform the image processing operation by using a first convolution layer group at the lowest level when first inferring the second object for the second region of interest. In this case, the electronic device 200 may search for a class (for example, "street tree", "dove", or "cloud") belonging to a first object group, which has relatively low importance. The electronic device 200 may perform the operation by using at least one convolution layer included in the first convolution layer group, and obtain first output data. In this case, the first output data may be class probability values that the second object is one of objects included in a first object group.

In operation S820, the electronic device 200 may calculate a relative difference between the class probability values, from among the class probability values of the second object. When the calculated difference between the class probability values is equal to or greater than a threshold value, the electronic device 200 may determine a class having the highest class probability value as a class of the second object in the second region of interest. When the calculated difference is less than the threshold value, the electronic device 200 may perform operation S830 to identify the class of the second object.

In operation S830, the electronic device 200 may determine whether it is possible to increase the number of usable kernels in at least one convolution layer included in the first convolution layer group. For example, the electronic device 200 may use only some of kernels from among a plurality of kernels included in the first convolution layer group, so as to reduce throughput. In this case, the electronic device 200 may determine whether there is a kernel that can be additionally used, and perform operation S840 to increase inference accuracy.

In operation S840, the electronic device 200 may increase the number of kernels to be used based on determining that there are additional kernels that can be used. The electronic device 200 may further use the increased number of kernels to perform the image processing operation on the convolution layers in the first convolution layer group and update the class probability values in operation S810, and calculate a difference between the updated class probability values and compare the difference with the threshold value in operation S820. When the calculated difference is equal to or greater than the threshold value, the electronic device 200 may determine the class having the highest class probability value as the class of the second object in the second region of interest.

Referring back to operation S830, the electronic device 200 may have used all kernels and determine that there are no more usable kernels. In this case, the electronic device 200 may perform operation S850 of adding a convolution layer for performing the operation, so as to determine the class of the second object.

In operation S850, the electronic device 200 may increase a level of a convolution layer group for performing the image processing operation. Specifically, the electronic device 200 may increase the level of the convolution layer group so as to further use a second convolution layer group connected to the first convolution layer group, and infer the second object by further using at least one convolution layer and at least one kernel included in the added second convolution layer group. Then, the electronic device 200 may perform operation S810 to update the class probability values of the second object, and perform operation S820 to calculate a difference between the updated class probability values and compare the difference with the threshold value. When the calculated difference is equal to or greater than the threshold value, the electronic device 200 may determine the class having the highest class probability value as the class of the second object in the second region of interest.

As described above, the electronic device 200 may repeat operations S810 through S850 until the class of the second object is determined. By repeating operations S810 through S850, the electronic device 200 may end the operation at an early stage when it is possible to determine the class of the second object in a convolution layer group of a low level, and determine the class of the second object.

FIG. 9 is a reference diagram for describing a method, performed by the electronic device 100, of using at least one convolution layer group to infer a second object in a second region of interest, according to an embodiment.

The electronic device 200 according to an embodiment may infer the second object via the method of FIG. 8, with respect to the second region of interest identified in a second frame.

Referring to FIG. 9, the electronic device 200 may use all or a part of a CNN when inferring the second object in the second region of interest, based on at least one of an occurrence frequency or importance of the second object.

For example, when the second region of interest is a second region of interest 920 including a "street tree", the electronic device 200 may perform an operation in first through third convolution layers by using a first convolution layer group 900, and obtain class probability values in a determination layer included in the first convolution layer group 900. Unlike the above example, when the second object in the second region of interest is not the "street tree", the class probability values output from the determination layer included in the first convolution layer group 900 may not be sufficient to infer the second object in the second region of interest. When a relative difference between the class probability values is less than a threshold value, the electronic device 200 may further perform an operation by using a second convolution layer group 910, and infer the second object in the second region of interest by using class probability values output from a determination layer included in the second convolution layer group 910. A method by which the electronic device 200 increases a level of a convolution layer group, based on a probability value, has been described above with reference to FIG. 8, and thus detailed descriptions thereof are not provided again.

As another example, when the second region of interest is a second region of interest 930 including a "pedestrian", the electronic device 200 may perform an operation in first through ninth convolution layers included in the CNN, and obtain the class probability values in a last determination layer. A method by which the electronic device 200 increases a level of a convolution layer group, based on a class probability value, has been described above with reference to FIG. 8, and thus detailed descriptions thereof are not provided again.

Also, the electronic device 200 may use only some of kernels from among a plurality of kernels included in the CNN, so as to reduce throughput. For example, when the class probability values are obtained by using the first convolution layer group 900, only some of a kernels (e.g. kernel 1-A, 1-B, 2-A, 2-B) from among the plurality of kernels 901 and 902 included in the first convolution layer group 900 may be used. The electronic device 200 may increase the number of kernels being used, based on the obtained class probability values. A method by which the electronic device 200 increases the number of kernels, based on a class probability values, has been described above with reference to FIG. 8, and thus detailed descriptions thereof are not provided again.

Figure 10:
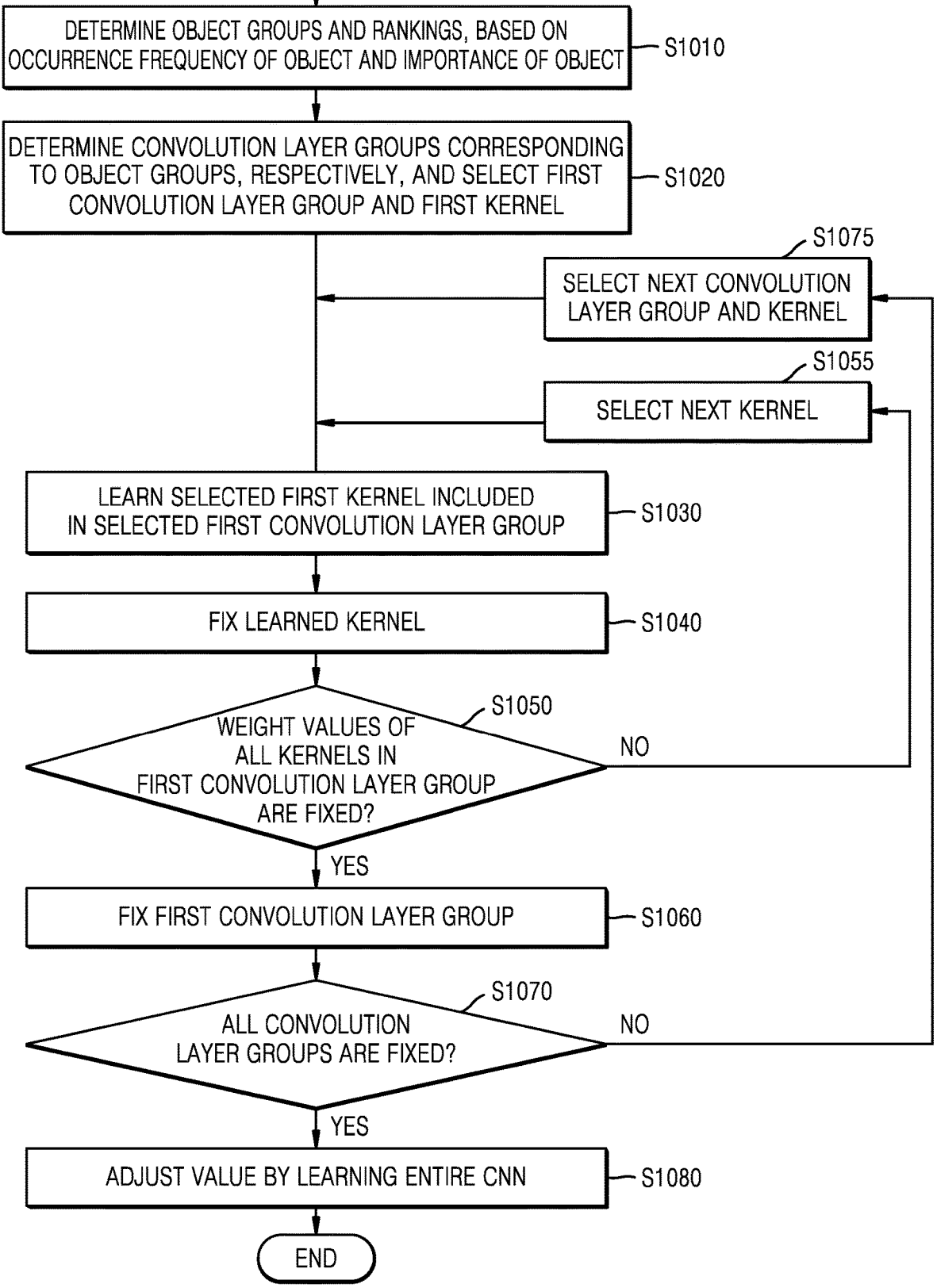
FIG. 10 is a flowchart of operations, performed by a learning server, for training a convolution neural network (CNN) model to be used by an electronic device, according to an embodiment.

FIG. 10 is a flowchart of operations, performed by the learning server 250, for training a CNN model to be used by the electronic device 200, according to an embodiment of the disclosure.

In operation S1010, the learning server 250 may determine object groups and rankings of the object groups, based on at least one of an occurrence frequency of an object or importance of the object. The object group determined based on the occurrence frequency and importance has been described above with reference to FIG. 6, and thus detailed descriptions are not provided again. The learning server 250 may determine the rankings of the determined object groups such that an object group having a high importance or a low occurrence frequency as a posterior object group to be inferred at the later part of a CNN, and an object group having low importance or a high occurrence frequency as an anterior object group to be inferred at the front part of the CNN. In other words, some object groups may be prioritized over other object groups based on the frequency of occurrence of an object in an image and the importance of an object in an image. However, a method of determining the rankings of the object groups is not limited thereto.

In operation S1020, the learning server 250 may determine convolution layer groups corresponding to the plurality of object groups respectively according to the rankings, and select a kernel corresponding to the determined convolution layer group. For example, the learning server 250 may select a first convolution layer group and a first kernel corresponding to a first object group. The first kernel selected by the learning server 250 may be selected based on priorities of kernels (for example, degrees of relation to objects included in the first object group for filtering the objects) so as to classify the objects included in the first object group from the first convolution layer group.

In operation S1030, the learning server 250 may learn the kernel selected in operation S1020. When the learning server 250 learns the selected kernel and updates a weight value, inference accuracy for an object group corresponding to the convolution layer group to which the kernel is included may be increased.

In operation S1040, the learning server 250 may fix a value of the learned kernel. The learning server 250 may fix the weight value of the kernel of which the learning is completed, and then train a kernel that is not learned and update a weight value thereof.

In operation S1050, the learning server 250 may identify whether weight values of all kernels in the convolution layer group are fixed. When there is a kernel of which a weight value is not fixed in the convolution layer group, the convolution layer group is a group that is not learned yet, and thus the learning server 250 may perform operation S1055.

In operation S1055, the learning server 250 may select a next kernel that is not learned. Here, the next kernel may be selected based on the priorities of the kernels (for example, the degrees of relation to the objects included in the first object group for filtering the objects). The learning server 250 may perform operations S1030 and S1040 on the selected next kernel to learn the next kernel and fix a weight value thereof.

The learning server 250 may repeatedly perform operations S1030 through S1055 until weight values of all kernels are fixed in the convolution layer group.

Referring back to operation S1050, the learning server 250 may identify whether the weight values of all kernels in the convolution layer group are fixed. When the weight values of all kernels in the convolution layer group are fixed, the learning of the convolution layer group is completed, and thus the learning server 250 may perform operation S1060.

In operation S1060, the learning server 250 may fix values of the convolution layer group of which the learning is completed. In this case, the convolution layer group of which the learning is completed may classify objects into classes included in the object group corresponding to the convolution layer group.

In operation S1070, the learning server 250 may identify whether values of all convolution layer groups in the CNN are fixed. When the values of all convolution layer groups in the CNN are not fixed, the learning of the CNN is not completed, and thus the learning server 250 may perform operation S1075.

In operation S0175, the learning server 250 may select a next convolution layer group connected to the convolution layer group of which the learning is completed, and a kernel included in the next convolution layer group. For the next convolution layer group, the learning server 250 may repeat operations S1030 through S1055 until weight values of all kernels in the next convolution layer group are fixed.

When the learning of the next convolution layer group is completed, the learning server 250 may fix values of the next convolution layer group. The learning server 250 may repeat operations S1060 through S1075 until all convolution layer groups included in the CNN are learned or trained.

Referring back to operation S1070, the learning server 250 may identify whether the values of all convolution layer groups in the CNN are fixed. When the values of all convolution layer groups in the CNN are fixed, the learning of the CNN is completed, and thus the learning server 250 may perform operation S1080.

In operation S1080, the learning server 250 may learn the CNN again so as to optimize the CNN. The learning server 250 may learn the CNN of which the learning is completed again to adjust the values of convolution layer groups and kernels via operations S1010 through S1075.

The learning server 250 according to an embodiment may transmit, to the electronic device 200, a CNN model generated via operations S1010 through S1080.

The electronic device 200 according to an embodiment may use the received CNN model to identify a first region of interest, a first object, a second region of interest, and a second object.

Figure 11:
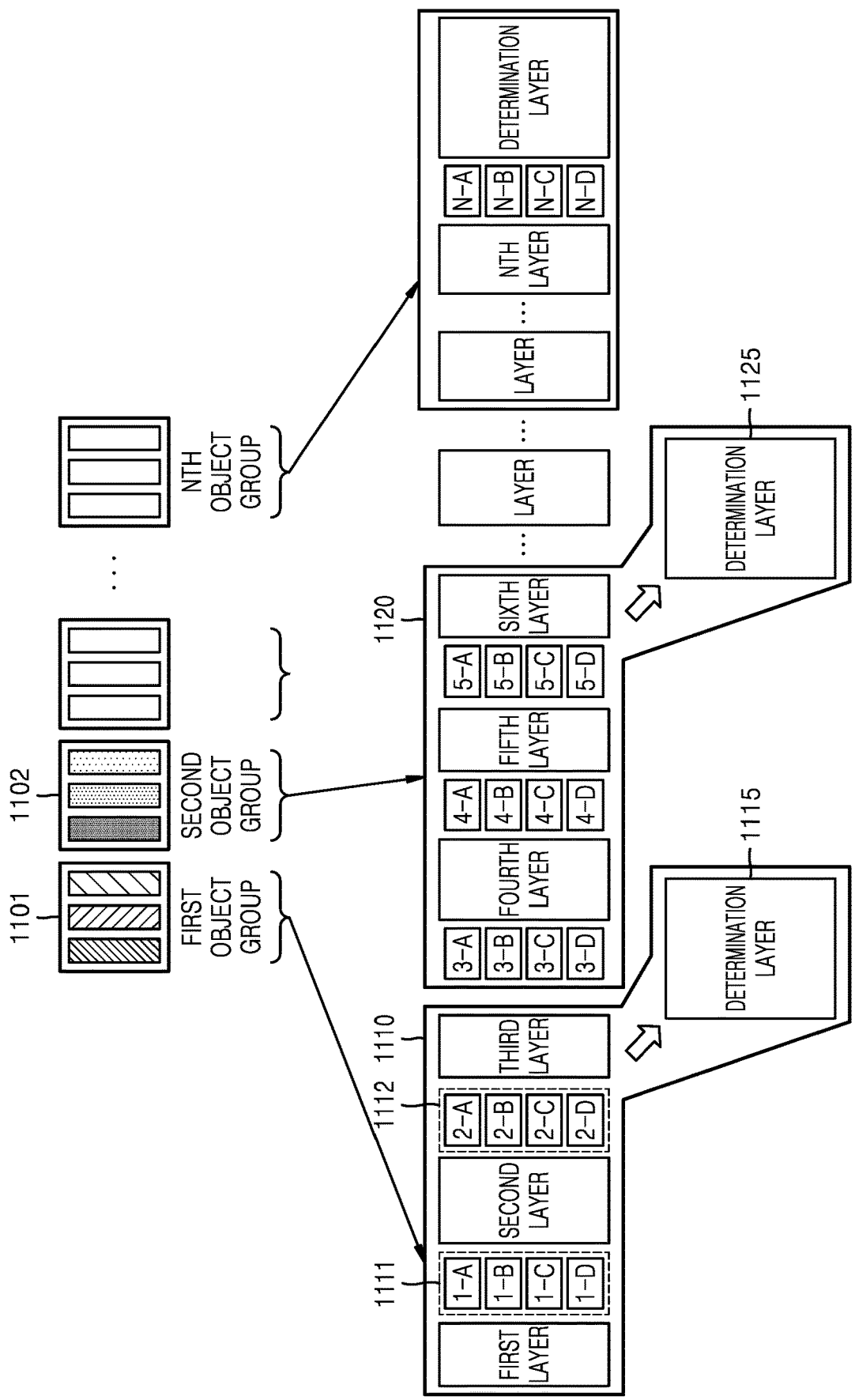
FIG. 11 is a reference diagram for describing operations, performed by a learning server, for training a convolution neural network model to be used by an electronic device, according to an embodiment.

FIG. 11 is a reference diagram for describing operations, performed by a learning server, for training a convolution neural network model to be used by an electronic device, according to an embodiment.

Referring to FIG. 11, the learning server 250 may determine object groups based on occurrence frequencies and importance of objects and determine rankings of the object group as first through Nth object groups. The object group determined based on the occurrence frequency and importance has been described above with reference to FIG. 6, and thus detailed descriptions are not provided again.

The plurality of ranked object groups may correspond to a plurality of convolution layer groups, respectively. For example, a first object group 1101 may correspond to a first convolution layer group 1110. A first determination layer 1115 included in the first convolution layer group 1110 may output first class probability values indicating probabilities that input data is an object included in the first object group 1101. Also, a second object group 1102 may correspond to a second convolution layer group 1120. A second determination layer 1125 included in the second convolution layer group 1120 may output second class probability values indicating probabilities that input data is an object included in the second object group 1102.

The learning server 250 according to an embodiment may initially train the first convolution layer group 1110 of the CNN when training the CNN. In this case, a first kernel 1-A 1111 included in the first convolution layer group 1110 may be learned first and a value thereof may be fixed. Then, a second kernel 1-B may be learned and a value thereof may be fixed. Next, a third kernel 1-C may be learned and a value thereof may be fixed. The learning server 250 may repeat operations of learning a kernel and fixing a value thereof, thereby completing learning of the first convolution layer group 1110. Operations by which the learning server 250 learns each kernel and fixes a weight value thereof have been described in detail with reference to FIG. 10, and thus detailed descriptions thereof are omitted here.

When the learning of the first convolution layer group 1110 is completed, the learning server 250 may fix values of the first convolution layer group 1110, and learn the second convolution layer group 1120 in the same manner.

In the same manner, the learning server 250 may fix values of convolution layer groups of which learning is completed, train a next convolution layer group to fix values up to an Nth convolution layer group corresponding to an Nth object group, thereby training all of the convolution layer groups of the CNN.

The learning server 250 according to an embodiment may train the CNN again so as to optimize the CNN. The learning server 250 may train the CNN of which the learning is completed again to adjust the values of convolution layer groups and kernels.

The learning server 250 according to an embodiment may transmit, to the electronic device 200, a CNN model of which learning is completed, and the electronic device 200 according to an embodiment may use the received CNN model to identify a first region of interest, a first object, a second region of interest, and a second object.

A method, performed by an electronic device, of inferring an object, according to an embodiment, may be recorded on a computer-readable recording medium by being implemented in a form of program commands executed by using various computers. The computer-readable recording medium may include at least one of a program command, a data file, or a data structure. The program commands recorded in the computer-readable recording medium may be specially designed or well known to one of ordinary skill in the computer software field. Examples of the computer-readable recording medium include magnetic media such as hard disks, floppy disks, and magnetic tapes, optical media such as CD-ROMs and DVDs, magneto-optical media such as floptical disks, and hardware devices specially configured to store and perform program commands, such as read-only memory (ROM), random-access memory (RAM), and flash memory. Examples of the computer command include mechanical codes prepared by a compiler, and high-level language codes executable by a computer by using an interpreter.

Furthermore, an electronic device or a method of inferring an object in an image, may be provided in a computer program product.

The computer program product may include a software program or a computer-readable storage medium storing a software program. For example, the computer program product may include a product (for example, a downloadable application) in a form of a software program that is electronically distributable through a manufacturer of the electronic device or an electronic market (for example, Google PlayStore™ or AppStore™). For electronic distribution, at least a part of the software program may be stored in the storage medium or temporarily generated. In this case, the storage medium may be a storage medium of a server of a manufacturer, a server of an electronic market, or a relay server that temporarily stores the software program.

The computer program product may include a storage medium of a server or a storage medium of a client apparatus in a system including the server and the client apparatus. When there is a third device, e.g., a smartphone, that communicates with the server or the client apparatus, the computer program product may include a storage medium of the third device. In addition, the computer program product may include the software program transmitted from the server to the client apparatus or the third device, or transmitted from the third device to the client apparatus.

In this case, one of the server, the client apparatus, and the third device may perform a method according to embodiments by executing the computer program product. Alternatively or additionally, two or more of the server, the client apparatus, and the third device may execute the computer program product to perform the method according to the embodiments of the disclosure in a distributed fashion.

For example, the server, for example, a cloud server or an artificial intelligence server, may execute the computer program product stored in the server to control the client apparatus communicatively connected to the server to perform the method according to the embodiments.

While some embodiments of the disclosure have been particularly shown and described in detail, it will be understood by one of ordinary skill in the art that various changes in form and details may be made therein without departing from the spirit and scope of the disclosure as defined by the following claims.

The invention claimed is:

1. A method of inferring an object in a moving image using a convolutional neural network (CNN) model, performed by an electronic device, the method comprising:
    identifying a first region of interest in a first frame among a plurality of frames in the moving image, and a first object in the first region of interest, by providing the first frame to a plurality of convolution layer groups sequentially connected in the CNN model;
    identifying a second region of interest in a second frame among the plurality of frames, the second region of interest corresponding to the first region of interest, and the second frame being after the first frame;
    providing the second region of interest to the CNN model, and obtaining first output data that is output from a first convolution layer group from among the plurality of convolution layer groups; and
    determining whether to identify a second object in the second region of interest by using a second convolution layer group from among the plurality of convolution layer groups, based on the first output data, wherein the second convolution layer group sequentially follows the first convolution layer group within the plurality of convolution layer groups.

2. The method of claim 1, further comprising selecting the first convolution layer group corresponding to the first object, from among the plurality of convolution layer groups.

3. The method of claim 1, wherein the obtaining the first output data comprises obtaining class probability values indicating probabilities that the second object in the second region of interest is one of first objects included in a first object group.

4. The method of claim 3, wherein a plurality of object groups correspond to the plurality of convolution layer groups, respectively, and
    the first object group from among the plurality of object groups corresponds to the first convolution layer group.

5. The method of claim 4, wherein the plurality of object groups correspond to the plurality of convolution layer groups, respectively, based on at least one of occurrence frequencies or importance of objects included in the plurality of object groups.

6. The method of claim 3, wherein the determining whether to identify the second object in the second region of interest by using the second convolution layer group comprises:
    obtaining a difference between the class probability values; and
    based on the difference being equal to or greater than a threshold value, determining to identify the second object in the second region of interest by using the first output data.

7. The method of claim 6, wherein the determining whether to identify the second object in the second region of interest by using the second convolution layer group comprises, based on the difference being less than the threshold value, determining to identify the second object in the second region of interest by using the second convolution layer group.

8. An electronic device for inferring an object in a moving image by using a convolutional neural network (CNN) model, the electronic device comprising:
    a memory storing one or more instructions; and
    a processor configured to execute the one or more instructions stored in the memory to:
        identify a first region of interest in a first frame among a plurality of frames in the moving image, and a first object in the first region of interest, by providing the first frame to a plurality of convolution layer groups sequentially connected in the CNN model;
        identify a second region of interest in a second frame among the plurality of frames, the second region of interest corresponding to the first region of interest, and the second frame being after the first frame;
        provide the second region of interest to the CNN model, and obtain first output data that is output from a first convolution layer group from among the plurality of convolution layer groups; and
        determine whether to identify a second object in the second region of interest by using a second convo- lution layer group from among the plurality of convolution layer groups, based on the first output data, wherein the second convolution layer group sequentially follows the first convolution layer group within the plurality of convolution layer groups.

9. The electronic device of claim 8, wherein the processor is further configured to execute the one or more instructions to select the first convolution layer group corresponding to the first object, from among the plurality of convolution layer groups.

10. The electronic device of claim 8, wherein the processor is further configured to execute the one or more instructions to obtain class probability values indicating probabilities that the second object in the second region of interest is one of first objects included in a first object group.

11. The electronic device of claim 10, wherein a plurality of object groups correspond to the plurality of convolution layer groups, respectively, and the first object group from among the plurality of object groups corresponds to the first convolution layer group.

12. The electronic device of claim 11, wherein the plurality of object groups correspond to the plurality of convolution layer groups, respectively, based on at least one of occurrence frequencies or importance of objects included in the plurality of object groups.

13. The electronic device of claim 10, wherein the processor is further configured to execute the one or more instructions to:

obtain a difference between the class probability values; and based on the difference being equal to or greater than a threshold value, determine to identify the second object in the second region of interest by using the first output data.

14. The electronic device of claim 13, wherein the processor is further configured to execute the one or more instructions to:

based on the difference being less than the threshold value, determine to identify the second object in the second region of interest by using the second convolution layer group.

15. A non-transitory computer-readable recording medium having recorded thereon a program that is executable by a computer to perform the method of claim 1.

16. The method of claim 1, wherein the determining whether to identify the second object in the second region of interest by using the second convolution layer group comprises:

based on the first output data indicating that the second object is not included in a first object group corresponding to the first convolution layer group, determining to identify the second object in the second region of interest by using the second convolution layer group.

* * * * *